March 4, 1941.      H. JUNGHANS      2,233,921
ANCHOR ESCAPEMENT FOR CLOCKS AND THE LIKE
Filed Jan. 26, 1940
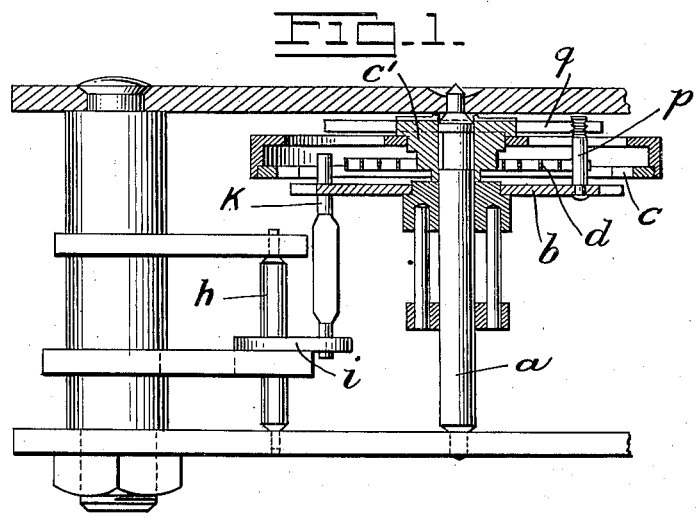
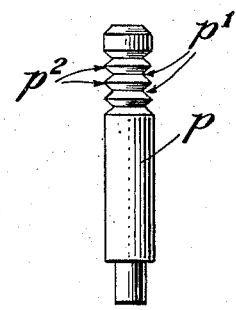
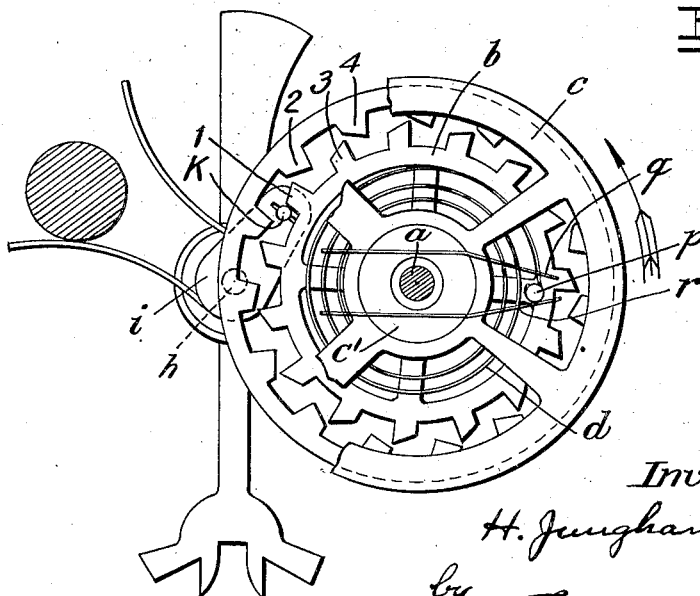
Inventor.
H. Junghans
by Thomas Howe Patented Mar. 4, 1941

2,233,921

UNITED STATES PATENT OFFICE 2,233,921

ANCHOR ESCAPEMENT FOR CLOCKS AND THE LIKE

Helmut Junghans, Schramberg-Sulgen, Germany

Application January 26, 1940, Serial No. 315,634
In Germany September 29, 1938

1 Claim. (Cl. 58—117)

This invention relates to anchor escapements for clocks and the like, and particularly to anchor escapements having only one anchor pin alternately engaging an externally toothed and a larger internally toothed escapement wheel, said wheels, mounted on the same spindle and having the same pitch of tooth, being flexibly coupled and capable of limited rotation with respect to each other.

It has been found that anchor escapements of this type as described, for instance in United States Patent No. 1,895,666 granted January 31, 1933, are open to the objection that oil creeping up to the stop faces, especially from the bearings of the escapement wheel spindle, may cause trouble by causing the limiting members to stick together.

The invention proposes to eliminate this drawback by making the point of contact of one limiting member or of both members as small as possible, for instance by grooving the zones of contact of a stop pin arranged on an escapement wheel so as to produce acute-angled elevations.

One form of the invention is illustrated in the accompanying drawing, in which

Figure 1 is a side elevation of the escapement, partly in section;

Fig. 2, a plan thereof; and

Fig. 3, a detail view of the grooved pin.

On the spindle $a$ is fixedly mounted the usual externally toothed escapement wheel $b$ and is loosely mounted the larger internally toothed escapement wheel $c$. Both wheels have the same pitch of tooth, but their lifting planes are oppositely directed. The teeth of one wheel are opposite to the wider gaps between the teeth of the other wheel. These wheels are coupled by a spiral spring $d$, of which the inner end is secured to the wheel $c$ and the outer end to a pin $p$ mounted on the wheel $b$. The pin $p$ engages with some play between two limiting springs $q$ and $r$ secured to the hub $c'$ of the wheel $c$. The anchor $i$ mounted on the spindle $h$ has only one arm and carries only one pin $k$ which, while the anchor $i$ is swinging, alternately engages with one or the other of the wheels $b$ and $c$.

In order to prevent oil, particularly oil that has become viscous through age and dirt, from creeping from the bearings of the escapement wheels in escapements of this class, up to the zone of contact of the stop pin $p$ and producing trouble by causing the limiting springs $q$, $r$ to stick to the pin, the invention provides the pin $p$ with grooves $p'$ so that sharp edged elevations $p^2$ are formed, and the contact surface between the limiting springs $q$, $r$ is thus reduced to a minimum. The grooves $p'$ effectively prevent the oil from traveling to the places of contact.

I claim:

In an anchor escapement for clocks and the like, the combination of an escapement wheel spindle, two escapement wheels mounted on said spindle, one fixedly and the other loosely, one of said wheels being externally toothed and the other being larger and internally toothed, said wheels having the same pitch of tooth but oppositely directed lifting planes, the teeth of one of said wheels being opposite to the wider gaps between the teeth of the other wheel, means flexibly coupling together said wheels, means limiting the rotation of said wheels with respect to each other, an oscillating anchor, two limiting springs secured to the hub of one of the escapement wheels and a grooved stop pin mounted on the other escapement wheel and engaging with play between said springs, said grooves being provided in the zone of contact of said stop pin and forming acute-angled elevations to prevent oil from creeping up to said zone of contact.

HELMUT JUNGHANS.